United States Patent
Bonner et al.

(10) Patent No.: US 9,491,599 B2
(45) Date of Patent: *Nov. 8, 2016

(54) SYSTEMS AND METHODS FOR PROVIDING WIRELESS ACCOUNT FEATURE NOTIFICATIONS TO MOBILE COMMUNICATION DEVICES

(71) Applicant: AT&T Mobility II LLC, Atlanta, GA (US)

(72) Inventors: Thomas W. Bonner, Smyrna, GA (US); Ted Stine, Suwanee, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 610 days.

This patent is subject to a terminal disclaimer.

(21) Appl. No.: 13/622,578

(22) Filed: Sep. 19, 2012

(65) Prior Publication Data

US 2014/0080458 A1  Mar. 20, 2014
US 2016/0242018 A9  Aug. 18, 2016

Related U.S. Application Data

(63) Continuation of application No. 12/573,458, filed on Oct. 5, 2009, now Pat. No. 8,285,251, which is a continuation of application No. 11/427,464, filed on Jun. 29, 2006, now Pat. No. 7,606,554.

(51) Int. Cl.
*H04Q 7/10* (2006.01)
*H04W 4/16* (2009.01)

(52) U.S. Cl.
CPC ...................................... *H04W 4/16* (2013.01)

(58) Field of Classification Search
CPC .......... H04W 4/16; H04W 4/26; H04W 4/00
USPC ....... 455/403, 407, 412.1, 412.2, 414.1, 425
See application file for complete search history.

(56) References Cited

U.S. PATENT DOCUMENTS

| | | |
|---|---|---|
| 6,771,953 B1 | 8/2004 | Chow et al. |
| 7,039,025 B1 | 5/2006 | Menon et al. |
| 7,296,291 B2 | 11/2007 | Tahan |
| 7,403,793 B2 | 7/2008 | Mauney et al. |
| 7,606,554 B1 | 10/2009 | Bonner et al. |
| 2003/0153283 A1 | 8/2003 | Kuwazoe |
| 2005/0003835 A1 | 1/2005 | Riise et al. |
| 2005/0020236 A1 | 1/2005 | Mauney et al. |
| 2005/0125692 A1 | 6/2005 | Cox et al. |
| 2006/0223501 A1 | 10/2006 | Van Moffaert et al. |

(Continued)

OTHER PUBLICATIONS

3rd Generation Partnership; Technical Specification Group Services and System Aspects; Description of Charge Advice Information (CAI), 3GPP TS 22.024 v6.1.0 (Jun. 2005).

(Continued)

*Primary Examiner* — Patrick Edouard
*Assistant Examiner* — Julio Perez
(74) *Attorney, Agent, or Firm* — Hartman & Citrin LLC

(57) ABSTRACT

Systems and methods for providing wireless account calling feature indications to a device are described. Feature indications are provided to inform a user of the device that an incoming call or outgoing call is eligible for an account calling feature based on whether the conditions for the calling feature to apply are currently met. The feature indications are provided to a display of the device and/or to a speaker of the device.

20 Claims, 9 Drawing Sheets

(56) References Cited

U.S. PATENT DOCUMENTS

| | | |
|---|---|---|
| 2007/0025246 A1 | 2/2007 | Pirzada et al. |
| 2007/0149202 A1 | 6/2007 | Mendiratta et al. |
| 2007/0162289 A1 | 7/2007 | Olsson et al. |
| 2009/0088179 A1 | 4/2009 | Stuempert et al. |

OTHER PUBLICATIONS

3rd Generation Partnership; Technical Specification Group Services and System Aspects; (CAMEL); Service definition—Stage 1, 3GPP TS 02.78 v7.2.0 (Dec. 2001).

Crowe, David "Thirsty for new features Get a CAMEL", Cellular Network Perspectives, www.cnp-wireless.com (Mar. 2001).

European digital cellular telecommunications system (Phase 2); Advise of Charge (AoC) supplementary services—Stage 2 (GSM 03.86), ETS 300 547 (Mar. 1995).

U.S. Office Action dated Oct. 14, 2011 in U.S. Appl. No. 12/573,458.

U.S. Notice of Allowance dated Jun. 8, 2012 in U.S. Appl. No. 12/573,458.

U.S. Office Action dated Mar. 18, 2009 in U.S. Appl. No. 11/427,464.

U.S. Notice of Allowance dated Sep. 1, 2009 in U.S. Appl. No. 11/427,464.

Meskauskas et al., "Customised Applications for Mobile Enhanced Logic (CAMEL)," Research Seminar on Nomadic Computing, May 1999, retrieved at http://citeseerx.ist.psu.edu/viewdoc/download-?doi=10.1.1.602.7712&rep=rep1&type=pdf on Feb. 4, 2016.

$3^{rd}$ Generation Partnership; Technical Specification Group Services and System Aspects; Description of Charge Advice Information (CAI), 3Gpp TS 22.024 v6.1.0 (Jun. 2005).

$3^{rd}$ Generation Partnership; Technical Specification Group Services and System Aspects; (CAMEL); Service definition—Stage 1, 3GPP TS 02.78 v7.2.9 (Dec. 2001).

Crowe, David "Thirsty for new features? Get a CAMEL?", Cellular Network Perspectives, www.cnp-wireless.com (Mar. 2001).

European digital cellular communications system (Phase 2); Advise of Charge (AoC) supplementary services—Stage 2 (GSM 03.86), ETS 300 547 (Mar. 1995).

SYSTEMS AND METHODS FOR PROVIDING WIRELESS ACCOUNT FEATURE NOTIFICATIONS TO MOBILE COMMUNICATION DEVICES

CROSS REFERENCE TO RELATED APPLICATIONS

This application is a continuation of U.S. application Ser. No. 12/573,458, filed Oct. 5, 2009 (now U.S. Pat. No. 8,285,251), which is a continuation of application Ser. No. 11/427,464, filed Jun. 29, 2006 (now U.S. Pat. No. 7,606,554), the entireties of which are herein incorporated by reference.

TECHNICAL FIELD

This invention relates generally to mobile communications systems. More particularly, the invention relates to providing feature indications to mobile communication devices regarding benefits associated with a wireless account.

BACKGROUND OF THE INVENTION

The use of mobile telecommunication services has become ubiquitous as technology advancements continue to provide ever-improving levels of quality, communication options, and mobile device features at affordable price levels. As the subscriber base continues to grow, many subscribers are even foregoing traditional land-line telephone connections in favor of using a mobile line as their sole personal method of telephone access. Competition among service providers for new and existing subscribers is fierce. Service providers spend millions in advertising campaigns designed to build a brand identity that appeals to consumers. Additionally, in order to entice a potential subscriber to sign up for service, providers often subsidize a part or all of a communication device purchase in exchange for the subscriber agreeing to enter into service contract of a specified length. As such, a given service provider has a substantial investment in its subscriber base.

An important factor in maximizing a service provider's profit is to minimize the number of customers leaving to go to a competitor. The rate at which customers leave to obtain services from competitors is often referred to as "churn" in the industry. As with any business it is imperative to foster goodwill between the customer and the brand through excellent customer service and competitive features. A common feature of many service providers is reduced cost or free airtime during non-peak hours such as nights and weekends. In addition, many service providers have implemented programs designed to create customer loyalty and minimize churn. Among these programs are free in-network calls. These programs can encourage subscribers to recommend their service provider to family and friends so that many of their wireless calls will be free. If a number of the subscriber's acquaintances follow this recommendation, each can converse wirelessly with the subscriber without the calls deducting from either party's pool of available airtime. Once the subscriber's service contract expires he or she is free to go to seek service from a competitor, but if this decision is made, then the benefit of free in-network calls to the family and friends also using the current service provider will be lost. In this way, free in-network call programs can encourage customer loyalty.

In order for a feature such as free nights and weekends or free in-network calling to generate goodwill with a customer, however, that customer must be aware that he or she is receiving that benefit. With post-paid calling plans and large monthly minute allotments, customers may often forget or be unaware of the benefits they are receiving for being a customer of a given service provider. Unless the customer reads the call history portion of their monthly bill in detail, they may not attribute a low amount of airtime used to nights/weekends and in-network calling programs. To achieve the potential minimization of churn and maximization of customer loyalty provided by these programs, systems and methods are needed to bring these benefits to a subscriber's attention at or near the time that the benefits are bestowed.

SUMMARY OF THE INVENTION

Devices, systems, and methods for providing a feature indication to a mobile device in a wireless communication system are disclosed. A device according to the present invention can include a transceiver, a display, a processor, and a memory. The memory can include a feature indication application configured to provide a feature indication to a user of the device, where the feature indication notifies the user that an account feature is being applied and/or will be applied to a given network service.

In one embodiment, the network service can be a telephone call, and the account feature can be free in-network calling. In this embodiment the feature indication can be provided on a display of the device prior to the telephone call being answered. The application can be configured to receive data from the network as to whether a feature is applicable. Alternatively, or in addition, the application can use data included in the memory of the device to determine if an account feature applies.

In another embodiment, the network service can be a telephone call and the account feature can be free calling during a specified time period. The application can be configured to receive data from the network as to whether a feature is applicable. Alternatively, or in addition, the application can use data included in the memory of the device to determine if an account feature applies. The feature indication can include information as to when the feature will apply to the network service in the future.

A system according to the present invention can include a network component configured to receive information regarding a network service to be provided to a device associated with a subscriber account, determine if an account feature applies to the account for the network service to be provided, and if so, send an account feature indication to the device. The network component can include a customized application for mobile enhanced logic service.

A method according to the present invention can include determining if a feature applies to a network service to be provided to a subscriber account and, if so, displaying a feature indication on a display of an associated device.

DETAILED DESCRIPTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
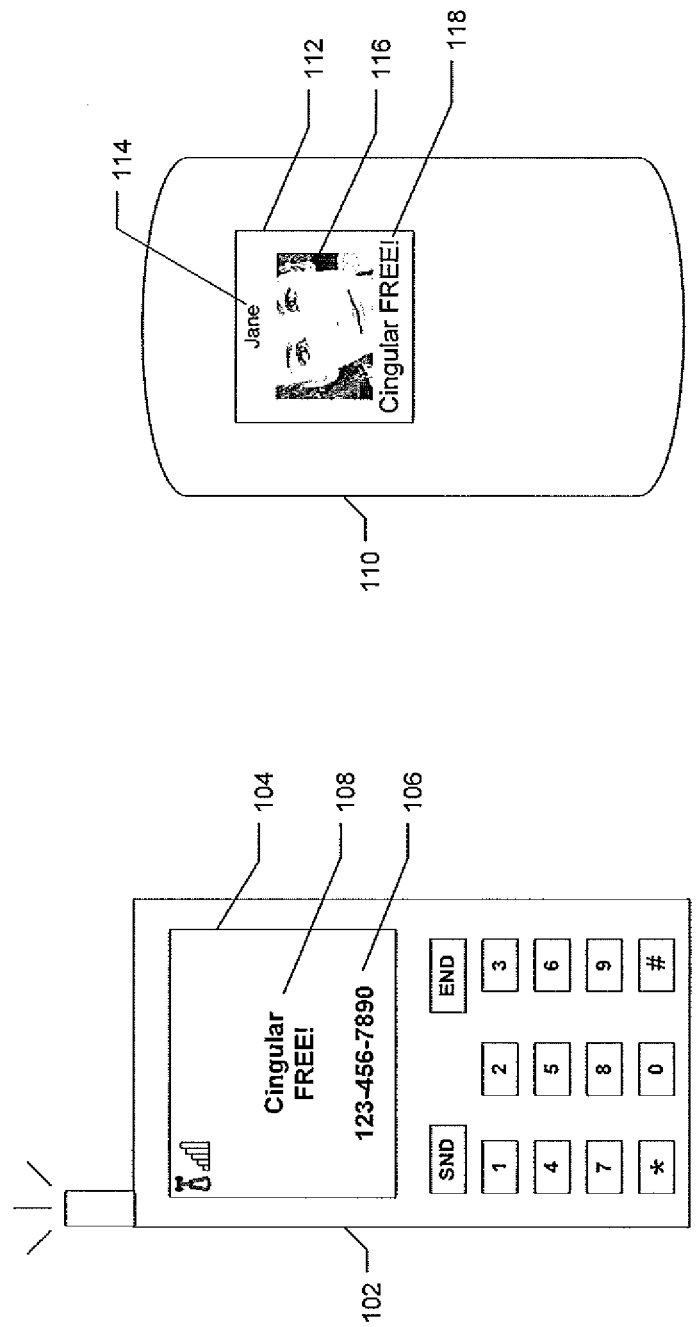
FIG. 1 depicts mobile devices providing a free call account feature indication on their displays for an in-network calling embodiment of the present invention.

Referring now to the drawings in which like numerals indicate like elements throughout the several views, the drawings illustrate certain of the various aspects of exemplary embodiments. FIG. 1 shows a mobile communication device 102 having a display 104. The mobile device 102 is depicted as a non-flip type device, but can be a flip-type mobile device. The display can include any of the display types known in the art such as LCD, LED, TFT, electronic paper and others. Furthermore, the display can also include forthcoming technologies such as organic LED, carbon nanotubes, or any other display capable of providing the feature indication described herein without departing from the scope of the invention. The display 104 is shown having a telephone number 106 and a feature indication 108.

The telephone number 106 can be the number of telephone line that is placing an incoming call to the mobile device 102 that has not been answered. The telephone number can also be the number of a telephone line that is currently engaged in a telephone call with the mobile device 102. Where the mobile device 102 has a matching telephone number stored in its memory, the mobile device can display a name associated with the number as is known in the art.

The feature indication 108 as shown reads "Cingular FREE!" to indicate that an incoming call is free and can remain on the display if and when the call is answered. "Cingular FREE!" is given as an example, and the feature indication 108 need not match this particular string. The feature indication 108 can include text, an icon, a logo, an image, an animation, a sound, a song, or any combination thereof to indicate that an account benefit applies to an incoming call, an outgoing call, a current call, and/or other communication service such as messaging, data transfers, and video services. The feature indication can be more effective if some indicia of the brand of the service provider is included, but branding the indication is optional.

For telephone call related embodiments, such as free in-network calling, the feature indication can be provided before an incoming call is answered, while the communication device is ringing. This is beneficial due to this being the point in time that the user of the mobile device 102 is most likely to be looking at the display 104 because mobile device users commonly view the display of their mobile device before answering to see who is calling.

The mobile device 110 is depicted as a flip-type mobile device having an external secondary display 112. Because many flip-type mobile devices are configured to answer an incoming call upon the device being opened, incoming call information is commonly displayed on a display that is viewable while the device is in a closed position. In the case of the mobile device 110, the device is shown as ringing for an incoming call. The display 112 shows the caller's name 114, shows a picture associated with the caller 116, and includes a feature indication 118. The name and picture of the caller can be stored in a memory of the mobile device 110 and retrieved based on the telephone number of the line calling the mobile device 110.

Figure 2:
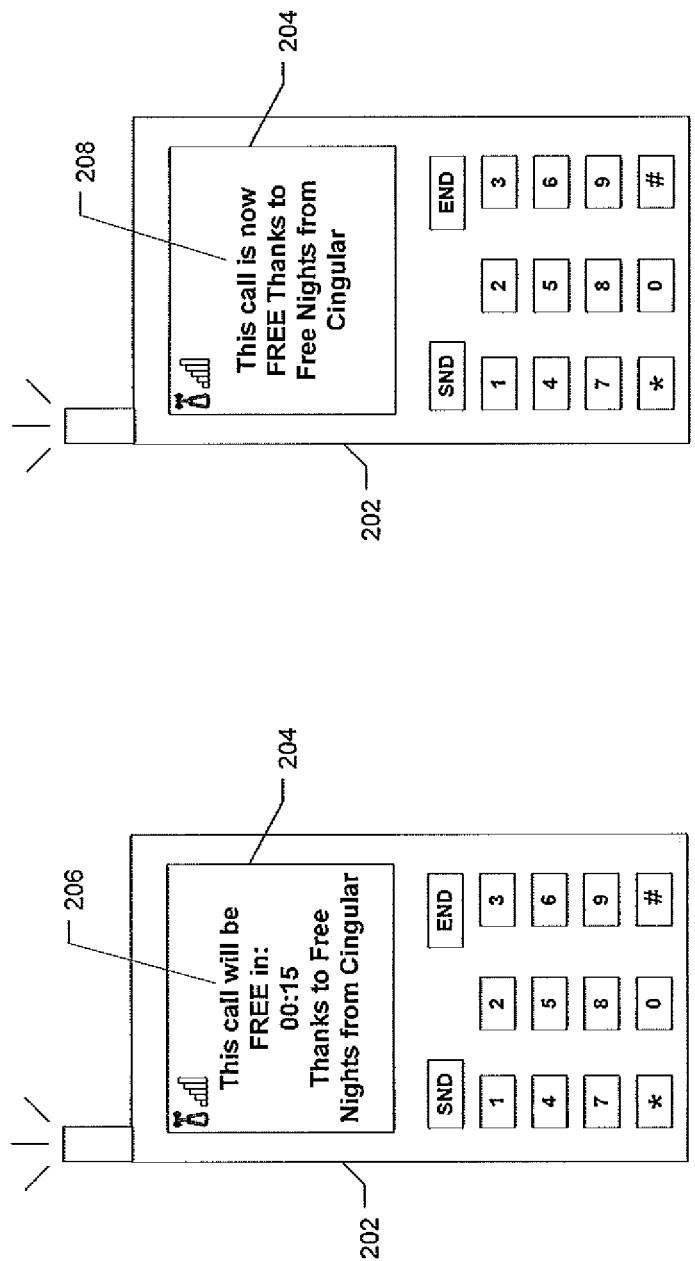
FIG. 2 depicts mobile devices providing a free call account feature indication on their displays for an off peak calling period embodiment of the present invention.

Referring now to FIG. 2, a mobile device 202 is shown having a display 204. The display includes feature indication 206 including the string "This call will be FREE in: 00:15 Thanks to Free Nights from Cingular." The feature indication 206 can inform a user that a current call, an incoming call, and/or a call being dialed will be eligible for the benefit of an account feature at a future time. The timer included in the feature indication 206 can inform the user of how long until the feature will apply—in this example, when the call will be free (i.e., the user will not be charged for additional airtime for the call after the timer reaches zero). Alternatively, the feature indication can merely indicate that the call will soon be free using, for example, "This call will soon be FREE" or other variations. The feature indication 206 can include text, an icon, a logo, an image, an animation, a sound, a song, or any combination thereof.

Once the service is eligible for the account benefit the feature indication 206 can change to show that the account feature now applies such as feature indication 208. The feature indication 208 includes, "This call is now FREE Thanks to Free Nights from Cingular." Alternatively, the feature indication could include "Cingular FREE!" or some other indication that the account feature now applies. The feature indication 208 can include text, an icon, a logo, an image, an animation, a sound, a song, or any combination thereof.

Systems and methods for determining whether a feature indication should be displayed, and how to cause it to be displayed are discussed below.

Figure 3:
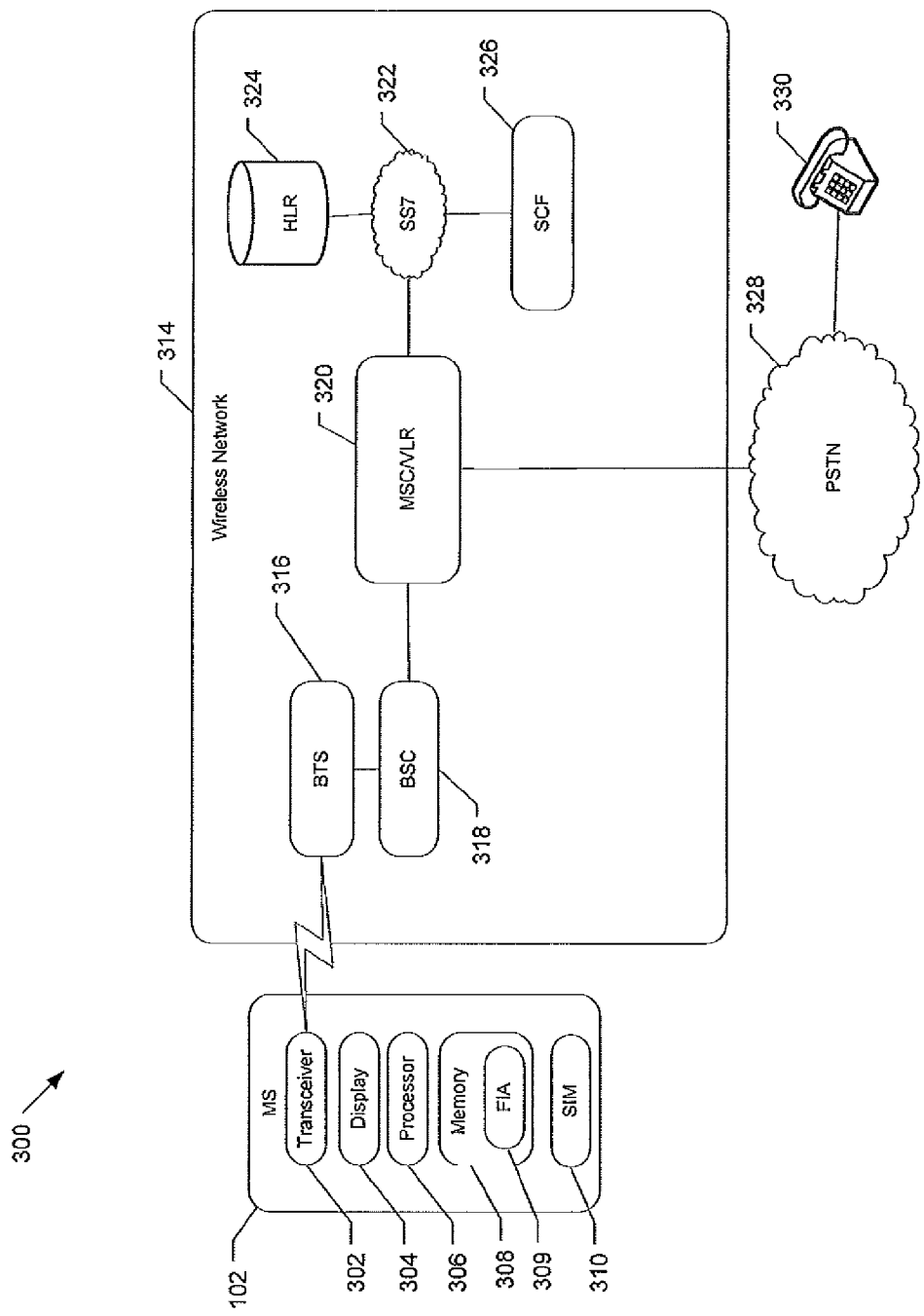
FIG. 3 is a block diagram of a system for providing account feature indications to mobile devices using CAMEL.

FIG. 3 shows an exemplary system 300 for providing a feature indication to a mobile subscriber in a GSM wireless communication network. The system shown is intended to be exemplary and not limiting. The present invention can be implemented in other systems for providing wireless communications known in the art, including but not limited to CDMA, CDMA2000, W-CDMA, UMTS, WiFi, and BLUETOOTH®. The mobile device 102 includes a subscriber identity module 310 (SIM), a computer readable memory 308, a processor 306, a display 304, and a transceiver 302 for communicating with a base transceiver station 316 (BTS) of the wireless network 314. The computer readable memory 308 can include a feature indication application 309 (FIA). The FIA 309 can be configured to receive information from the wireless network 314 indicating whether a feature indication should be displayed on the mobile device 102. In some embodiments, the FIA 309 is configured to read the contents of an address book of the mobile device 102 to determine if a feature indication should be displayed—where the address book includes a flag to mark entries as being subscribers to the same wireless communications provider as that of the mobile device 102. In still another embodiment, the FIA 309 is configured to read a clock of the mobile device 102 to determine if a feature indication should be displayed on the mobile device 102.

The wireless network 314 includes a BTS 316 for communicating with the mobile device 102 and the base station controller 318 (BSC). The BSC 318 communicates with a mobile switching center/visitor location register 320 (MSC/VLR), which provides switching functions and temporary storage of subscriber information for mobile devices located within the MSC/VLR's service area. The MSC/VLR 320 can communicate via signal system 7 (SS7) network 322 with a home location register 324 (HLR) and a service control function 326 (SCF). As is known in the art, the HLR 324 contains subscriber information for authorized users of the wireless network 314.

The SCF 326 performs services related to customized applications for mobile enhanced logic (CAMEL) in the wireless network 300. The 3rd Generation Partnership Project (3GPP) maintains technical specifications for wireless communications including specifications for CAMEL. These documents can be obtained on the Internet at www.3gpp.org. Document 3GPP TS 02.78 includes technical specifications for CAMEL. The entirety of this document is incorporated by reference herein.

CAMEL is a protocol for providing intelligent network functions in a GSM network. The protocol can be used to simplify the process of adding customized features to a wireless network. Use of the protocol can permit the addition of custom features without burdening the MSC with processing of these features. External devices can instead be used to perform processing in support of the custom features. The SCF 326 is such a device.

The HLR 324 stores information indicating whether subscribers have CAMEL service. Upon a CAMEL enabled subscriber of the wireless network 300 registering with the network, the HLR 324 transfers CAMEL subscription information (CSI) to network elements that need the information to provide CAMEL service to the subscriber. The CSI can include originating CSI (O-CSI) and terminating CSI (T-CSI).

The CSI includes a trigger detection profile (TDP) for the subscriber. The TDP includes a list of conditions (triggers) which when met trigger the invocation of external call processing logic. Upon a trigger being detected normal call processing is suspended and control of processing is handed off from the MSC to the external CAMEL elements (e.g., the SCF 326) to provide the CAMEL service. These CAMEL elements can perform the processing necessary to provide the customized feature. Alternatively, if these elements determine that the feature should not be invoked, control can be returned to the MSC without further processing being performed.

Figure 4:
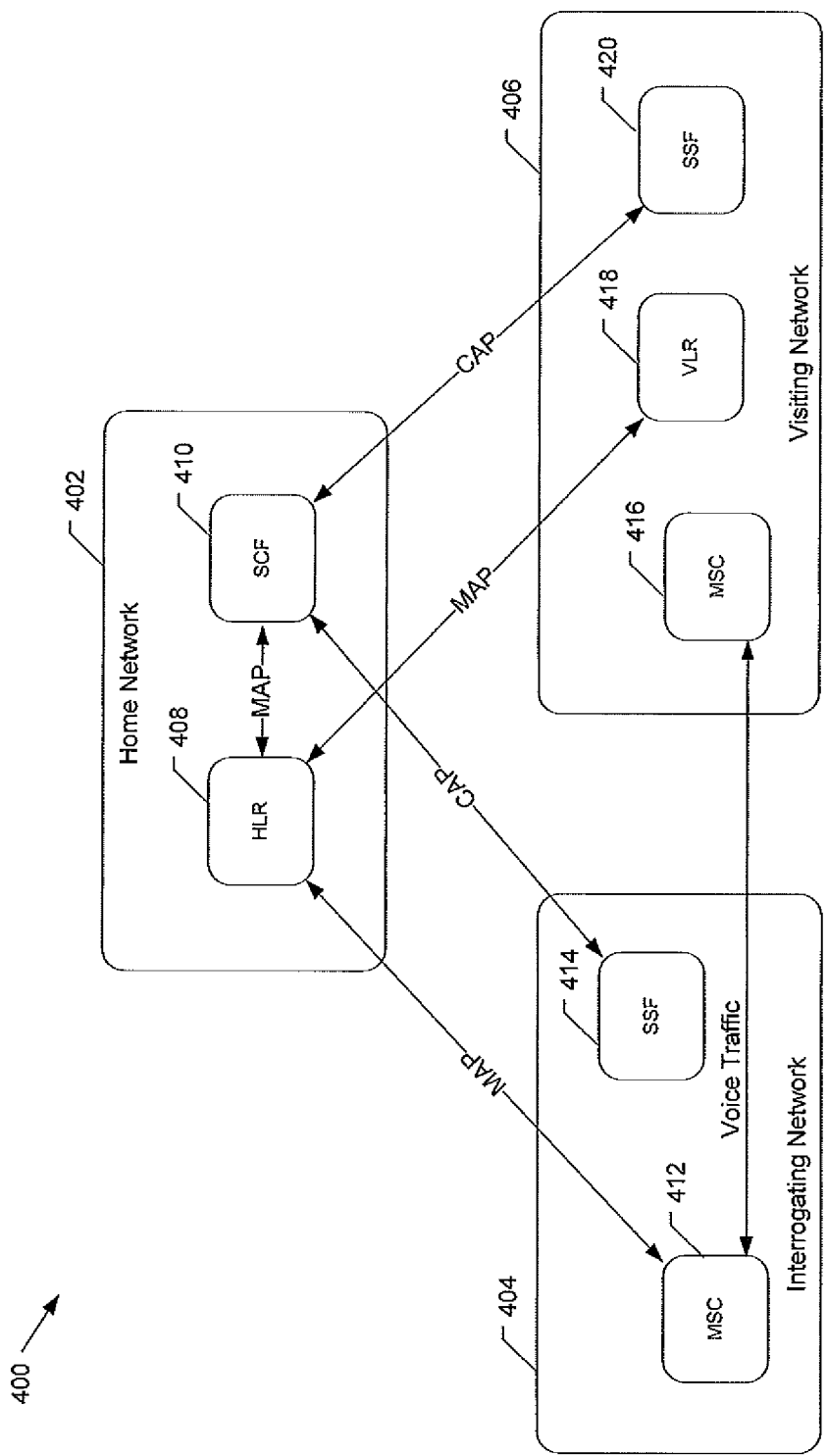
FIG. 4 is a block diagram showing the provisioning of CAMEL services across multiple wireless communication networks.

Customized features provided by CAMEL can be provided to subscribers roaming outside of their home networks, as is known in the art. FIG. 4 is a block diagram showing a home network 402, an interrogating network 404, and a visiting network 406 for providing CAMEL services to subscribers roaming outside of their home networks. Double arrows depict communication between elements, and include "MAP" or "CAP" to denote mobile application part, and CAMEL application part, respectively, is used for the communications. The line between the MSC 412 and the MSC 416 depicts voice traffic.

For handling originating calls, O-CSI is provided to the VLR 418 of the visiting network 406 upon a roaming mobile device (having the home network 402 as its PLMN) registering with the VLR 418. The VLR 418 can provide this information to the MSC 416 for use in processing calls originating from the roaming mobile device. If the MSC 416, using the information provided by the HLR 408, detects that the roaming mobile device has O-CSI associated with it, the MSC 416 can contact the SCF 410 through the service switching function 420 (SSF) to get instructions on how to handle CAMEL triggers for calls originating from the roaming mobile device.

For calls terminating at the roaming mobile device, the MSC 412 of the interrogating network can query the HLR 408 to obtain the location of the roaming mobile subscriber. In its response, the HLR 408 can include the CSI for the roaming mobile device. If the roaming mobile device has T-CSI associated with it, the MSC 412 can query the SCF 410 via the SSF 414 for instructions on CAMEL processing for the call terminating at the roaming mobile device.

In-Network Calling Feature Indication.

Figure 5:
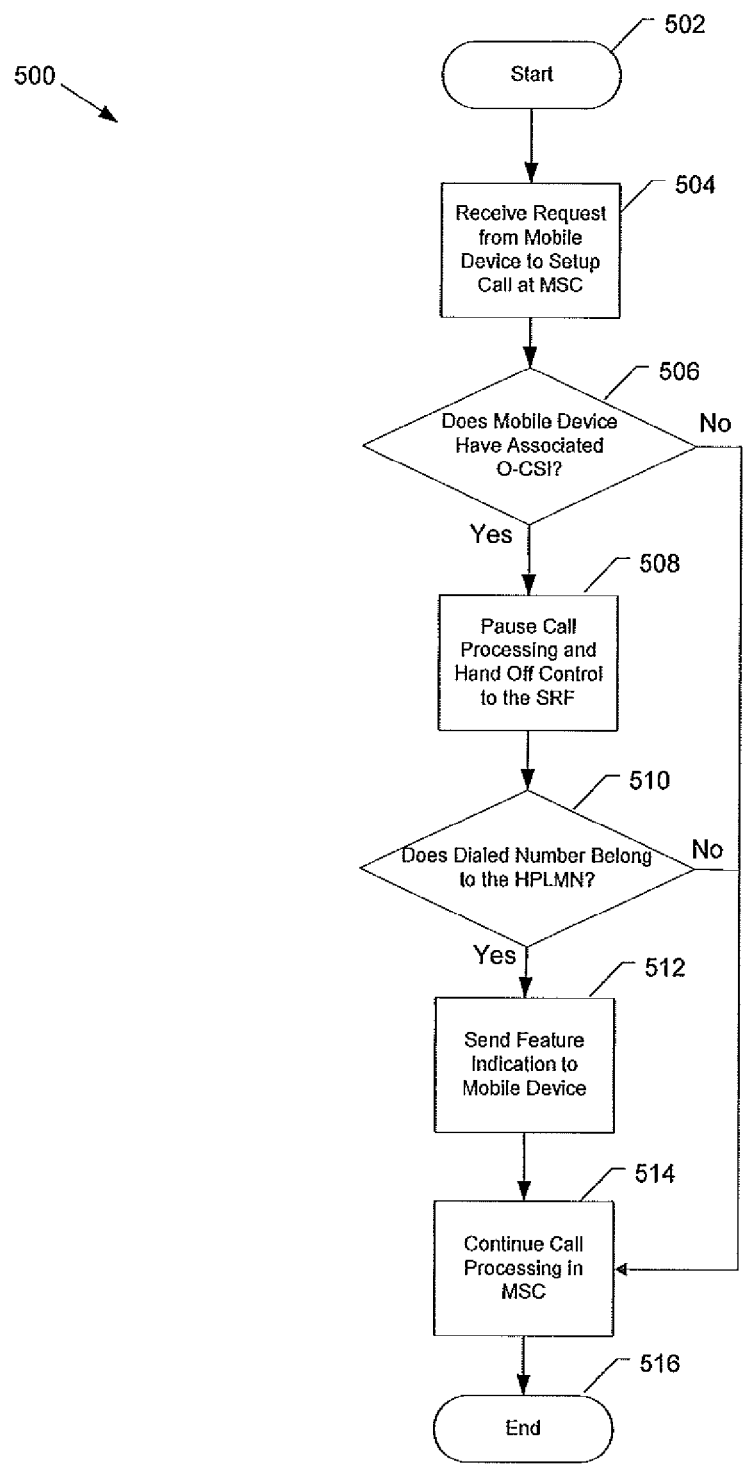
FIG. 5 is a flowchart of a method for providing an account feature indication on a mobile device display in a free in-network calling embodiment of the present invention for an outgoing call placed from a mobile device.

FIG. 5 is a flowchart of a method 500 for providing a free in-network call feature indication to a mobile device for an outgoing call sent from the mobile device. The method begins at block 502 and continues to block 504 where a request is received at an MSC from a mobile device to set up a call. As described above, the MSC has access to information previously obtained from the HLR of the mobile device (upon registration) as to whether the account is provisioned for CAMEL services. At block 506, if the mobile device has O-CSI, the method continues to block 508 where call processing is paused in the MSC and control of call processing is handed off to the SRF. If no O-CSI for the mobile device exists, the method continues to block 514 where the MSC continues to process the call. From block 508, the method continues to block 510 where the dialed number is checked to determine if it belongs to the same HPLMN as the mobile device placing the call. This determination can be made the SRF querying the HLR to determine if the account associated with the dialed number is found in the records of the HLR.

If the dialed number does not belong to the HPLMN of the mobile device placing the call, the method continues to block 514. If the dialed number does belong to the HPLMN of the mobile device placing the call, a feature indication is sent to the mobile device placing the call at block 512. The indication can be provided by the SRF to the FIA on the mobile device. The FIA can then cause a feature indication to be shown on a display of the mobile device.

It should be understood that the method of FIG. 5 is exemplary and should not be considered limiting. Modifications can be made without exceeding the scope of the present invention. For example, while the method 500 shows that call processing is paused while an in-network determination is being made, call processing could alternatively continue while the in-network determination is being made. This can prevent network functions from being excessively slowed by feature indication processing.

Figure 6:
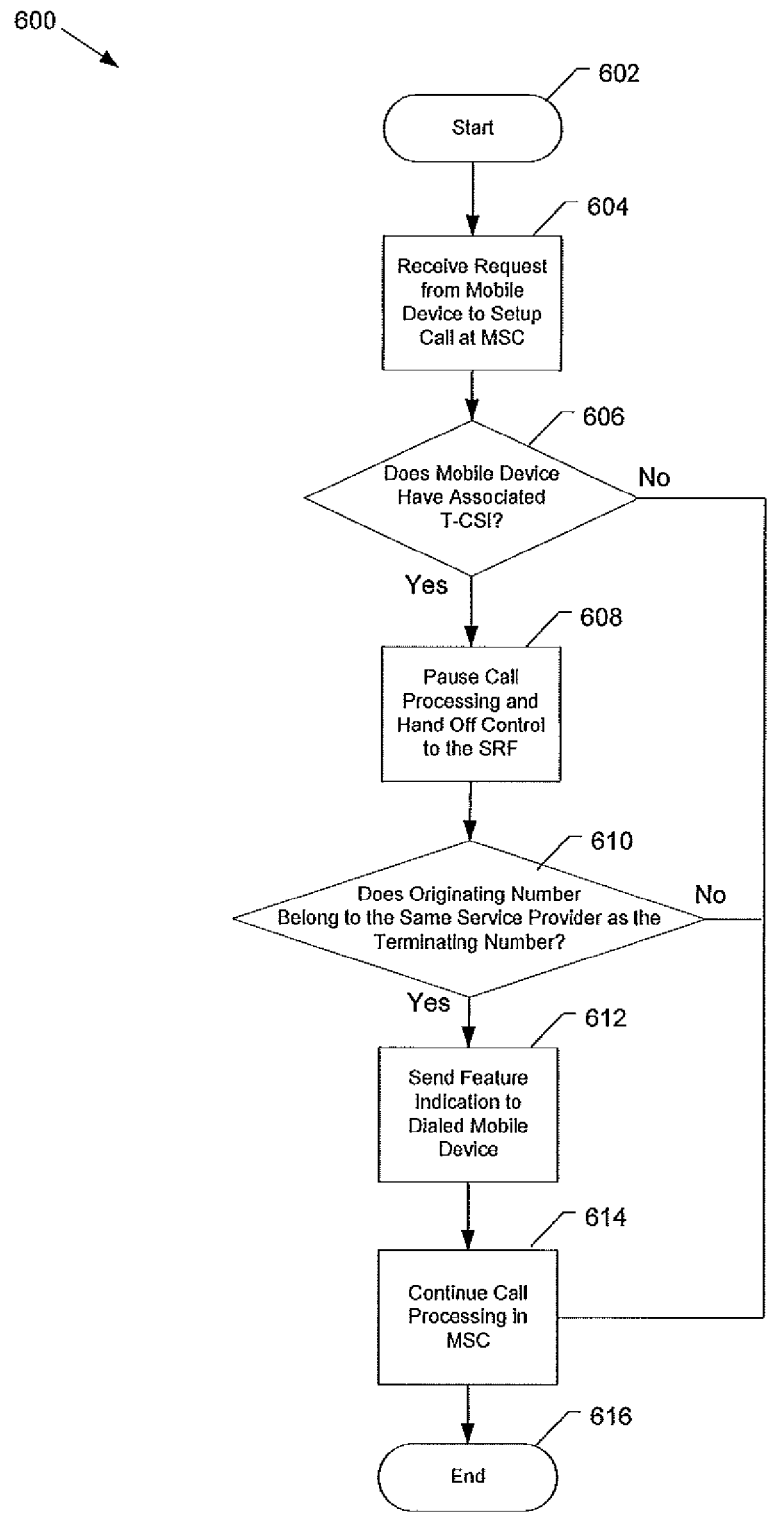
FIG. 6 is a flowchart of a method for providing an account feature indication on a mobile device display in a free in-network calling embodiment of the present invention for an incoming call placed to a mobile device.

FIG. 6 is a flowchart of a method 600 for providing a free in-network call feature indication to a mobile device for an incoming call sent to the mobile device. The method starts at block 602 and proceeds to block 604 where a request is received at an MSC to setup a call. As described above, the MSC can receive information from the HLR of the terminating mobile device at the time the MSC queries the HLR for the terminating mobile's location. At block 606, if the mobile device has T-CSI, the method continues to block 608 where call processing is paused in the MSC and control of call processing is handed off to the SRF. If no T-CSI exists, the method continues to block 614 where the MSC continues processing the call.

From block 608 the method continues to block 610 where the originating number is checked to determine if it belongs to the same affinity group as the terminating number. This determination can be made by the SCF querying the HLR of the originating device and the HLR of the terminating mobile device to ascertain whether both devices are serviced by the same wireless service provider. Alternatively, a database including account and/or subscriber identifiers (such as international mobile subscriber identifiers or E.164 compliant wireless telephone numbers) for a wireless service provider can be queried to make the determination. This database can merely include identifiers associated with accounts which are eligible for the account feature or can include all identifiers for the service provider where the identifiers are marked using database fields as to which, if any, features apply to an associated account. If the originating number does not belong to the same service provider as the terminating number the method continues to block 614. If the originating number belongs to the same service provider as the terminating mobile device, the method continues to block 612 where a feature indication is sent to the mobile device. The indication can be provided by the SRF to the FIA on the terminating mobile device. The FIA can then cause a feature indication to be shown on a display of the mobile device. The method 600 proceeds to block 614 where call processing is continued in the MSC. The method 600 ends at block 616.

It should be understood that the method of FIG. 6 is exemplary and should not be considered limiting. Modifications can be made without exceeding the scope of the present invention. For example, while the method 600 shows that call processing is paused while an in-network determination is being made, call processing could alternatively continue while the in-network determination is being made. This can prevent network functions from being excessively slowed by feature indication processing.

Figure 7:
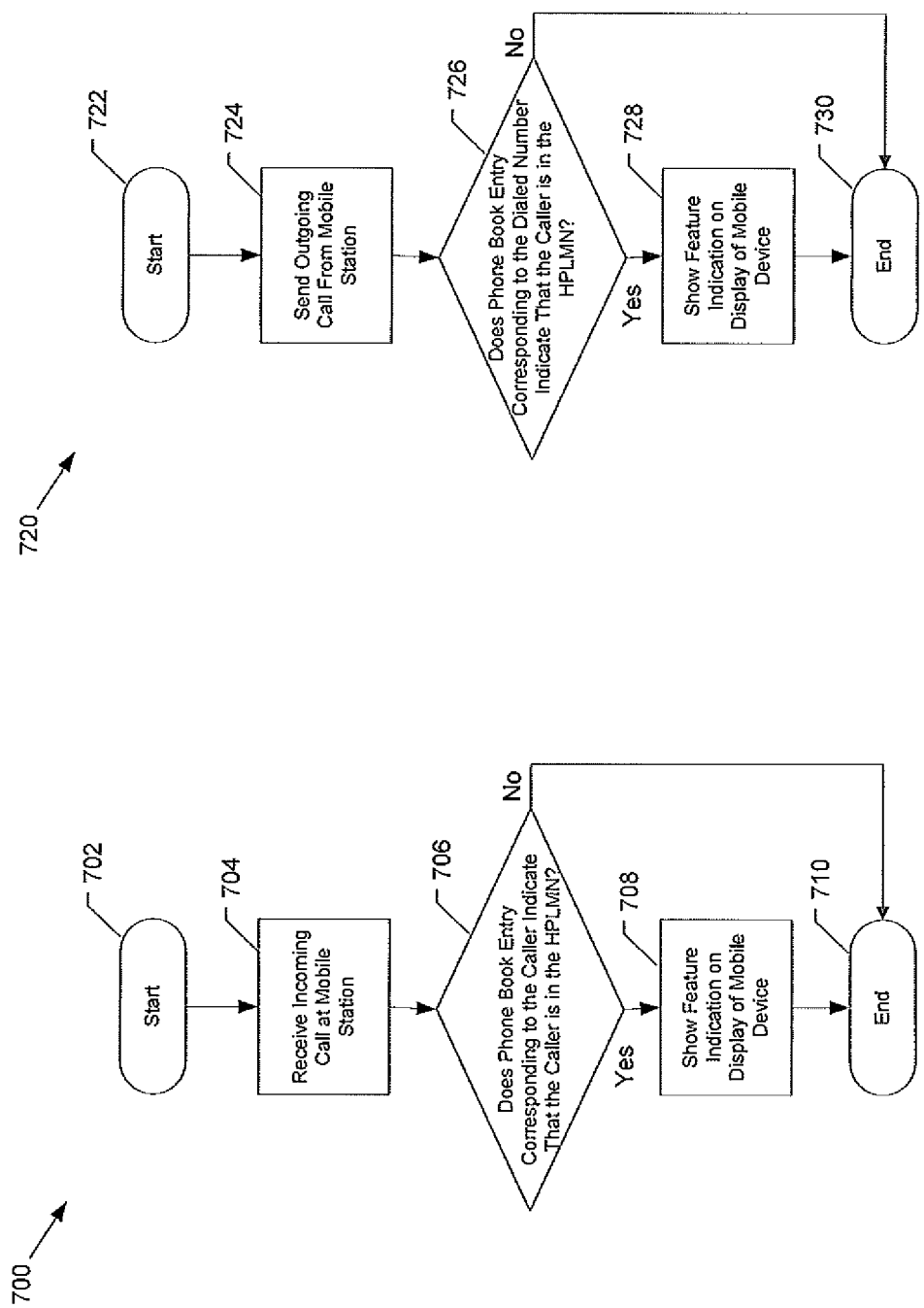
FIGS. 7A and 7B are flowcharts for methods for providing a free in-network call feature indication to a mobile device using a mobile device address book to determine if the call qualifies for free in-network calling.

FIGS. 7A and 7B are flowcharts for methods for providing a free in-network call feature indication to a mobile device using a mobile device address book to determine if the call qualifies for free in-network calling. The method 700 begins at block 702 and proceeds to block 704 where an incoming call is received at a mobile device. The method proceeds to block 706 where the phone (i.e., address) book of the mobile device is checked for an entry that corresponds to the telephone number placing the incoming call. This check can be performed by an FIA of the mobile device. If a corresponding entry is found, that entry is checked to determine if a flag is set that indicates that the entry is part of the same HPLMN as the mobile device receiving the call. If the phone book entry is not found, or if the entry does not indicate that it belongs to the same home network as the mobile device receiving the call, the method ends at block 710. If the phone book entry indicates that the device is part of the same network, the method continues to block 708 where a feature indication is shown on a display of the mobile device. This action can be performed by an FIA of the mobile device.

The method 720 begins at block 722 and proceeds to block 724 where an outgoing call is placed from a mobile device. The method proceeds to block 726 where the phone (i.e., address) book of the mobile device is checked for an entry that corresponds to the telephone number being called. This check can be performed by an FIA of the mobile device. If a corresponding entry is found, that entry is checked to determine if a flag is set that indicates that the entry is part of the same HPLMN as the mobile device dialing the call. If the phone book entry is not found, or if the entry does not indicate that it belongs to the same home network as the mobile device dialing the call, the method ends at block 730. If the phone book entry indicates that the device is part of the same network, the method continues to block 728 where a feature indication is shown on a display of the mobile device. This action can be performed by an FIA of the mobile device.

In both method 700 and 720 the flag in the phone book (which indicates that the entry is part of the same HPLMN as the mobile device on which the phone book is stored) can be set manually by a user of the mobile device who is aware of the wireless service provider used by the subscriber associated with the phone book entry. Alternatively, this flag can be set by communications with the network.

The advantage of setting a flag as opposed to checking the respective HPLMNs of the parties of a call is that the flag can be set once or periodically. Once the flag is set, checking this flag does not require the use of network resources to provide a call feature indication. The disadvantage is that the service provider of a phone entry can change, and if the phone book is not updated to reflect this change, erroneous call feature indications will be displayed.

The embodiments described above should not be considered limiting. In another embodiment for a free calling feature, a wireless service provider can offer free calling between a subscriber's phone and a group of numbers instead of, or in addition to, free in-network calling.

A group of numbers to and from which the subscriber's phone can make and receive free calls can be stored in a database in communication with the wireless network. Individual telephone numbers (and/or other telephone line identifiers) can be stored in the database and associated with the subscriber's account, for example, the telephone numbers for the subscriber's parents and grandparents—whether wired or wireless. Parameters describing groups of related telephone numbers can also be stored in the database and associated with the subscriber's account, for example, all telephone numbers belonging to a geographical area, and/or all telephone numbers belonging to a certain exchange, and/or all telephone numbers belonging to a certain area code, and/or all telephone numbers belonging to a specified wired or wireless network provider.

The telephone lines associated with the subscriber's account can, taken together, describe an affinity group with who the subscriber can communicate over the wireless network without being charged for the airtime used. With the affinity group database in place, the system can query this database to determine if a call is free as disclosed above with regard to the previously described embodiments to determine if a feature indication should be displayed on the subscriber's device. The system can display the feature indication as described above if it is determined that the feature indication should be shown.

An interface can be provided to permit a subscriber to add telephone numbers (or other line identifiers) to the database for addition to the affinity group. The interface can also permit removal of the identifiers, however, such changes could be limited in order to prevent the temporary addition of number for a call and their subsequent removal after the call.

The affinity group embodiment can be used to encourage the use of telephone service from certain network providers such as providers with which the wireless service provider has an established business relationship, such as the addition of all telephone numbers serviced by a landline carrier having a business relationship with the wireless service provider.

Call Feature Indication Based on a Time of Day or Day of Week Parameter.

Section 9 of 3GPP TS 02.78 (page 21 of that document) describes the use of CAMEL in wireless account charging activities. One or more rates for a call can be sent from a CAMEL service environment (such as a SCF) to a mobile device after the detection of a CAMEL trigger. If more than one rate is sent to the mobile device, a time at which the additional rates become effective can be sent. These values can be provided to the FIA on the mobile device of the present invention to provide a feature indication on the mobile device. Using the rate data, the FIA can provide a feature indication on the mobile device while it is ringing for an incoming call or while it is ringing an outgoing call to indicate that the feature is applicable to the call. In addition, if more than one rate is supplied to the FIA, the FIA can display a feature indication that includes a notice of when the feature will become applicable in the future. For example, a countdown timer can be provided to indicate that a call will soon be free due to the applicability of a free nighttime calls feature of a wireless account.

Using the example of free nighttime calls, if a rate supplied to the FIA by the SCF is zero (such that the call is free), the FIA can cause the mobile device to display "This Call is Free Due to Free Nights and Weekends from CIN-GULAR!" while the mobile device is ringing. If more than one rate is supplied to the FIA, and one of the rates is zero, the FIA can use the time at which the zero rate applies to display a feature indication that notes that the call will become free in the future, such as a countdown timer. The countdown timer can be updated periodically as the time for the zero rate to apply approaches.

Figure 8:
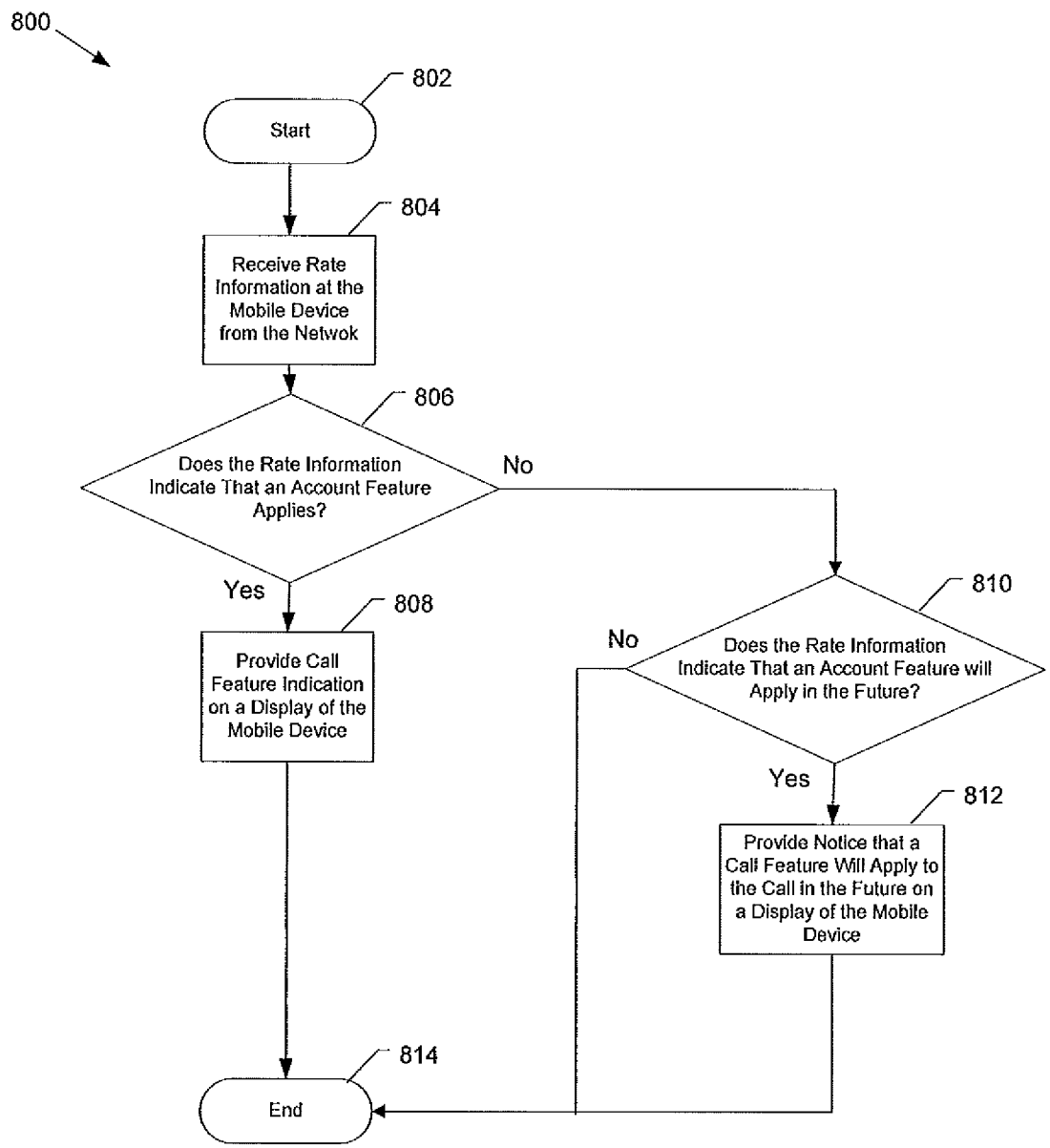
FIG. 8 is a flowchart depicting a method for providing a call feature indication based on a time of day or a day of week parameter.

FIG. 8 is a flowchart depicting method 800 for providing a call feature indication based on a time of day or a day of week parameter. The method starts at block 802 and proceeds to block 804 where rate information for a call is received at a mobile device from a wireless network. The information can be received during call set up. At block 806 the rate information can be checked to determine if an account feature will apply to the call. If an account feature will apply to the call when answered the method proceeds to block 808 where a call feature indication is shown on a display of the mobile device and the method ends at block 814. If an account feature will not apply to the call when answered, the rate information can be checked at block 810 to determine if an account feature will apply in the future. If not, the method ends at block 814. If an account feature will apply in the future, notice is provided at block 812 to a display of the mobile device that an account feature will apply to the call in the future. The method ends at block 814.

In some embodiments the FIA can provide call feature indications for time of day or day of week based call features based on the internal calendar of the mobile device. Upon a mobile device registering with a wireless network, its internal clock and calendar are synched with the network. Using the internal clock the FIA can determine if an incoming or outgoing call will benefit from an account calling feature such as free nights and/or weekends. The FIA can be supplied with information regarding whether or not free nights and/or weekends applies to the account. This can be in the form of one or more flags stored in the computer readable memory of the device. These flags can be updated manually by a user of the device who is aware that the account associated with the device is eligible for free nights and/or weekends. Alternatively, the flag(s) can be set by communications between the mobile device and the network. If the parameters of applicability change (such as a night being considered to begin earlier than previously indicated) the network can push new information to the mobile device, updating the FIA.

Figure 9:
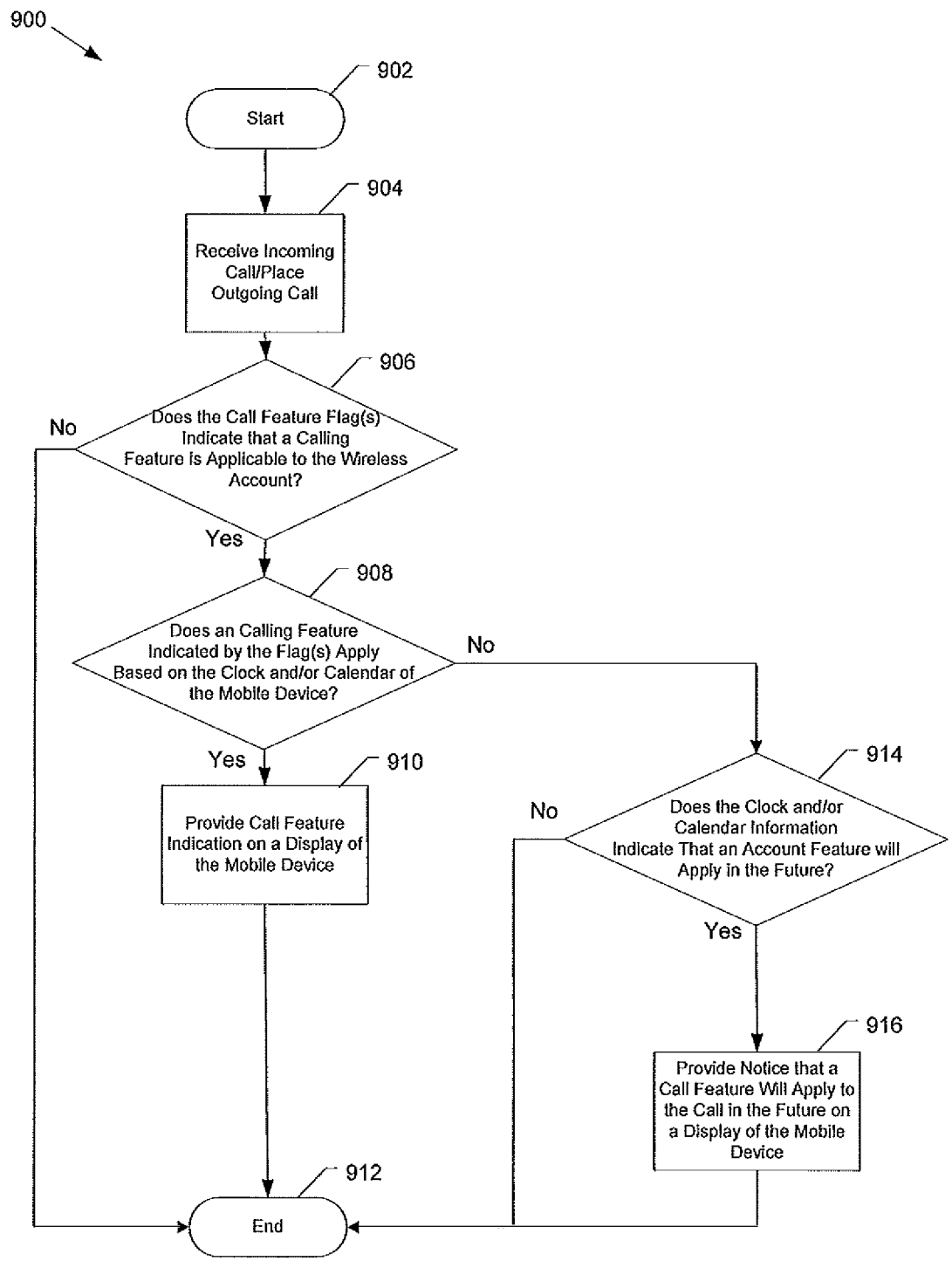
FIG. 9 is a flowchart depicting a method for providing a call feature indication based on a time of day or day of week utilizing call feature flags on the mobile device.

FIG. 9 is a flowchart depicting method 900 for providing a call feature indication based on a time of day or day of week utilizing call feature flags on the mobile device. The method begins at block 902 and proceeds to block 904 where an outgoing call is placed from/or an incoming call is received at a mobile device. At block 906 a check is performed to determine if call feature flags are set to indicate that a calling feature applies to the wireless account associated with the mobile device. For example, if the account is eligible for free nighttime calling a flag can be set to indicate that this is the case. Likewise a flag can be set to indicate that the account is eligible for free weekend calling. In some embodiments a single flag can be used to denote that the account is eligible for both free nighttime and free weekend calling. The check of the calling feature flags can be performed by an FIA on the mobile device. If the flags do not indicate that a calling feature applies to the account the method ends at block 912.

If the flags indicate that a calling feature applies to the account, the clock and/or calendar of the mobile device can be checked to determine if the calling features indicated by the flags currently apply. If the account features do apply, the method proceeds to block 910 where a call feature indication is provided on a display of the mobile device and the method ends at block 912. The call feature identification can be provided by the FIA. If the calling features do to not currently apply, the method continues to block 914 where the clock and or calendar information is checked to determine if an account feature will apply in the future. If not, the method ends at block 912. If an account feature will apply in the future, a notice is provided on a display of the mobile device at block 916. Of course, in the case of free nights and weekends, these account features will eventually apply to a call if its duration is long enough. However, a time window can be set so that notice of future applicability of account features will be provided only when the time to their applicability is within the window. A time window, for example, of five minutes can be set.

In some embodiments, the FIA can, regardless of whether a call is being placed, or an incoming call exists, provide a notification on a display of the mobile device indicating that a call feature applies to any calls that might be placed or might be received. That is, continuing with the example of free nights and weekends, the FIA can use the clock and calendar of the mobile device to provide an indication as to whether any calls to or from the device are free or will be free in the future. In this embodiment the FIA provides these call feature indications while the device is powered on and registered with a wireless network (registered with its home wireless network if this is required for call feature applicability).

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

We claim:

1. A device, comprising:
   a processor;
   a memory in communication with the processor and having stored thereon non-transitory computer-readable instructions which, when executed by the processor, cause the processor to perform operations comprising:
      determining whether a feature is applicable to a network service provided to the device, the network service comprising a communication service, and the feature comprising a usage of the communication service for communication between a plurality of devices associated with a group of accounts, the determining including:
         searching a database for an entry corresponding to the network service; and
         responsive to finding the entry, checking a flag associated with the entry to determine whether the usage of the communication service is by devices associated with the group; and
         responsive to determining that the usage of the communication service is associated with the group, communicating an indication to the device that the feature applies to the network service.

2. The device of claim 1, wherein the communication service comprises messaging, and the usage of the communication service comprises free use of airtime for messaging between the plurality of devices associated with the group.

3. The device of claim 2, wherein the free use of airtime for messaging applies during a specified time period.

4. The device of claim 1, wherein the communication service comprises data transfer, and the usage of the communication service comprises free use of airtime for data transfer between the plurality of devices associated with the group.

5. The device of claim 4, wherein free use of airtime for data transfer applies during a specified time period.

6. The device of claim 1, wherein the communication service comprises video services, and the usage of the communication service comprises free use of airtime for video services for the plurality of devices associated with the group.

7. The device of claim 6, wherein the free use of airtime for video services applies during a specified time period.

8. A method, comprising:
   receiving a request from a first device to initiate communication with a second device over a network, wherein the request identifies a network service to be provided to the first device, a first account associated with the first device, and a second account associated with the second device;
   determining, by a processor, based on the request, whether the first account and the second account are members of a group of accounts, wherein accounts from among the group of accounts are not charged for airtime for communications between devices associated with the members of the group of accounts;
   responsive to determining that the first account and the second account are members of the group of accounts, determining, by the processor, whether a feature applies to the network; and
   responsive to determining that the feature applies to the network service, transmitting a feature indication to the first device.

9. The method of claim 8, wherein the network service comprises messaging, and the feature comprises free messaging between the first device and the second device via the network.

10. The method of claim 8, wherein the network service comprises data transfer, and the feature comprises free data transfer between the first device and the second device via the network.

11. The method of claim 8, wherein the network service comprises video services, and the feature comprises free usage of video services for communications between the first device and the second device via the network.

12. The method of claim 8, wherein the network service comprises messaging, and the feature comprises free messaging during a specified time period.

13. The method of claim 8, wherein the network service comprises data transfer, and the feature comprises free data transfer during a specified time period.

14. The method of claim 8, wherein the network service comprises video services, and the feature comprises free usage of video services during a specified time period.

15. A non-transitory computer-readable storage medium having instructions stored thereon which, when executed by a processor, cause the processor to perform operations comprising:
   determining whether a user account feature is applicable to a network service provided to a wireless communications device, wherein the network service comprises a data communication, and the user account feature comprises free use of airtime for data communications between communication devices associated with user accounts belonging to an affinity group, the determining including:
      searching an address book for an entry corresponding to the data communication;
      responsive to finding the entry corresponding to the data communication, checking an affinity group flag of the entry to determine whether the data communication is between communication devices associated with the user accounts belonging to the affinity group; and
      responsive to determining that the data communication is between communication devices associated with the user accounts belonging to the affinity group, communicating a feature indication, prior to the data communication being established, for notifying a user of the wireless communication device that the user account feature applies to the network service provided to the wireless communications device.

16. The non-transitory computer-readable storage medium of claim 15, wherein the data communication comprises messaging, and the free use of airtime for data communications comprises free use of airtime for messaging between the communication devices associated with the user accounts belonging to the affinity group.

17. The non-transitory computer-readable storage medium of claim 16, wherein the free use of airtime for messaging applies during a specified time period.

18. The non-transitory computer-readable storage medium of claim 15, wherein the data communication comprises data transfer, and the free use of airtime for data communications comprises free use of airtime for data transfer between the communication devices associated with the user accounts belonging to the affinity group.

19. The non-transitory computer-readable storage medium of claim 18, wherein the free use of airtime for data transfer applies during a specified time period.

20. The non-transitory computer-readable storage medium of claim 15, wherein the data communication comprises video services, and the free use of airtime for data communications comprises free use of airtime for video services for the communication devices associated with the user accounts belonging to the affinity group during a specified time period.

* * * * *